(12) United States Patent
Kuno et al.

(10) Patent No.: US 10,262,035 B2
(45) Date of Patent: Apr. 16, 2019

(54) ESTIMATING DATA

(71) Applicant: Hewlett Packard Enterprise Development LP, Houston, TX (US)

(72) Inventors: Harumi Kuno, Palo Alto, CA (US); Goetz Graefe, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 309 days.

(21) Appl. No.: 15/032,977

(22) PCT Filed: Nov. 14, 2013

(86) PCT No.: PCT/US2013/070083
§ 371 (c)(1),
(2) Date: Apr. 28, 2016

(87) PCT Pub. No.: WO2015/073003
PCT Pub. Date: May 21, 2015

(65) Prior Publication Data
US 2016/0253384 A1   Sep. 1, 2016

(51) Int. Cl.
*G06F 17/30* (2006.01)

(52) U.S. Cl.
CPC .. *G06F 17/30469* (2013.01); *G06F 17/30327* (2013.01); *G06F 17/30589* (2013.01)

(58) Field of Classification Search
CPC ......... G06F 17/30469; G06F 17/30589; G06F 17/30327
USPC ....................................................... 707/718
See application file for complete search history.

(56) References Cited

U.S. PATENT DOCUMENTS

| | | | | |
|---|---|---|---|---|
| 4,774,657 A * | 9/1988 | Anderson | ......... | G06F 17/30961 |
| 5,379,422 A * | 1/1995 | Antoshenkov | .... | G06F 17/30327 |
| 5,664,171 A * | 9/1997 | Agrawal | .......... | G06F 17/30469 |
| 5,864,841 A * | 1/1999 | Agrawal | .......... | G06F 17/30469 |
| 5,875,445 A * | 2/1999 | Antonshenkov | .............................. G06F 17/30327 |
| 6,012,054 A * | 1/2000 | Seputis | ............. | G06F 17/30469 700/146 |
| 6,108,648 A * | 8/2000 | Lakshmi | .......... | G06F 17/30469 |
| 6,343,288 B1* | 1/2002 | Lindsay | ............ | G06F 17/30539 |
| 6,353,826 B1* | 3/2002 | Seputis | ............. | G06F 17/30463 |
| 6,421,664 B1* | 7/2002 | Groeschel | ......... | G06F 17/30327 |
| 6,738,755 B1* | 5/2004 | Freytag | ............. | G06F 17/30469 |
| 6,947,934 B1* | 9/2005 | Chen | ................. | G06F 17/30412 |
| 7,213,012 B2* | 5/2007 | Jakobsson | .......... | G06F 17/30463 |
| 7,313,553 B2* | 12/2007 | Faunce | ............. | G06F 17/30312 |
| 7,337,167 B2* | 2/2008 | Muras | ............... | G06F 17/30587 |
| 7,376,638 B2* | 5/2008 | Gordon | ............ | G06F 17/30306 |

(Continued)

OTHER PUBLICATIONS

Aoki, P.M., "Algorithms for Index-Assisted Selectivity Estimation", Report No. USB//CSD-98-1021, Oct. 1998, 36 pages. (Year: 1998).*

(Continued)

*Primary Examiner* — Phuong Thao Cao
(74) *Attorney, Agent, or Firm* — Hewlett Packard Enterprise Patent Department

(57) ABSTRACT

Disclosed herein are a system, non transitory computer-readable medium, and method for estimating database performance. A request for an estimate of data is read. The estimate is calculated based at least partially on a node located in a data structure.

20 Claims, 4 Drawing Sheets

(56) References Cited

U.S. PATENT DOCUMENTS

| | | | | |
|---|---|---|---|---|
| 7,805,410 B2* | 9/2010 | Sasaki | | G06F 17/30289 707/674 |
| 7,930,277 B2* | 4/2011 | Ge | | G06F 17/30935 707/688 |
| 7,987,200 B2* | 7/2011 | Faunce | | G06F 17/30469 707/791 |
| 8,108,399 B2* | 1/2012 | Dumitru | | G06F 17/30336 707/741 |
| 8,880,511 B2* | 11/2014 | Kim | | G06F 17/30979 707/719 |
| 2003/0018618 A1* | 1/2003 | Bestgen | | G06F 17/30469 |
| 2004/0117396 A1* | 6/2004 | Avadhanam | | G06F 17/30327 |
| 2004/0267713 A1* | 12/2004 | Chaudhuri | | G06F 17/30985 |
| 2005/0160093 A1* | 7/2005 | Abdo | | G06F 17/30616 |
| 2005/0228772 A1* | 10/2005 | Faunce | | G06F 17/30312 |
| 2005/0240624 A1* | 10/2005 | Ge | | G06F 17/30935 |
| 2006/0015809 A1* | 1/2006 | Hattori | | G06F 17/30929 715/255 |
| 2006/0074875 A1* | 4/2006 | Faunce | | G06F 17/30463 |
| 2006/0106777 A1* | 5/2006 | Faunce | | G06F 17/30469 |
| 2006/0235818 A1* | 10/2006 | Muras | | G06F 17/30587 |
| 2006/0271504 A1* | 11/2006 | Anderson | | G06F 17/30312 |
| 2007/0136317 A1* | 6/2007 | Przywara | | G06F 17/30498 |
| 2008/0065594 A1* | 3/2008 | Faunce | | G06F 17/30469 |
| 2008/0071754 A1* | 3/2008 | Muras | | G06F 17/30587 |
| 2008/0222087 A1* | 9/2008 | Balmin | | G06F 17/30935 |
| 2008/0288444 A1* | 11/2008 | Edwards | | G06F 17/30469 |
| 2009/0150413 A1* | 6/2009 | Basu | | G06F 17/30469 |
| 2009/0299989 A1* | 12/2009 | Zhang | | G06F 17/30469 |
| 2011/0029507 A1* | 2/2011 | Au | | G06F 17/30489 707/714 |
| 2011/0145244 A1* | 6/2011 | Kim | | G06F 17/30469 707/737 |
| 2013/0054567 A1* | 2/2013 | Graefe | | G06F 17/30463 707/714 |
| 2013/0066880 A1* | 3/2013 | Schramm | | G01C 21/32 707/743 |
| 2013/0138679 A1* | 5/2013 | Kim | | G06F 17/30979 707/765 |
| 2013/0151505 A1* | 6/2013 | Yoon | | G06F 17/30442 707/718 |
| 2014/0101133 A1* | 4/2014 | Carston | | G06F 17/30469 707/718 |
| 2014/0214793 A1* | 7/2014 | Tatemura | | G06F 17/30306 707/713 |
| 2014/0229464 A1* | 8/2014 | Milenova | | G06F 17/30477 707/718 |
| 2014/0379693 A1* | 12/2014 | May | | G06F 17/30463 707/718 |
| 2015/0112966 A1* | 4/2015 | Tokuda | | G06F 17/30463 707/718 |

OTHER PUBLICATIONS

Piatetsky-Shapiro et al., "Accurate Estimation of the Number of Tuples Satisfying a Condition", ACM, 1984, pp. 256-276. (Year: 1984).*

Aoki P.M., "Algorithms for Index-Assisted Selectivity Estimation", Report No. UCB//CSD-98-1021, Oct. 1998, Computer Science Division (EECS), University of California, Berkeley, California, pp. 1-36. (Year: 1998).*

Bradley M., "Guide to Database Performance and Tuning: Predicate Estimation", Oracle Rdb Journal, Aug. 2003, pp. 1-52. (Year: 2003).*

M. Colgan, "The Oracle Optimizer Explain the Explain Plan," An Oracle White Paper, May 2011, pp. 1-30, Oracle Corporation, Available at: <oracle.com/technetwork/database/bi-datawarehousing/twp-explain-the-explain-plan-052011-393574.pdf>.

Lydia Parziale et al., "Best Practices for SAP BI Using DB2 9 for z/OS," Information Management software, IBM, Third Edition, Mar. 2008, pp. Book Cover, i-XVI, 1-356, Book Spine, Book Back; Redbooks, Availablet at: <redbooks.ibm.com/redbooks/pdfs/sg246489.pdf>, 375 Pages.

PCT Search Report/Written Opinion ~ Application No. PCT/US2013/070083 dated Aug. 21, 2014 ~ 12 pages.

* cited by examiner

ESTIMATING DATA

BACKGROUND

Database management software may utilize various hierarchical data structures to index and store data. One approach used to predict and improve database performance is to estimate the amount of data it would return in response to a given predicate. Such estimates may be used to optimize a query plan.

DETAILED DESCRIPTION

As noted above, the performance of a database may be improved with an optimized query plan. The optimization of a query plan may be based upon estimates of the amount of data the query would process and an execution engine's ability to carry out the query. A query may comprise a predicate with criteria such that a response to the predicate contains data satisfying the criteria. Therefore, the performance of a query may be predicted by estimating the amount of data that would satisfy a predicate associated with the query. The data estimates may be obtained without actually executing the predicate since doing so may utilize a significant amount of resources. Thus, one way to estimate the amount of data returned in response to a predicate is to sample data from the database and generate histograms based on the samples. Unfortunately, the underlying data in a database may be very large and may be distributed unevenly. Therefore, estimates produced using a sampling or histogram approach may be off by multiple orders of magnitude.

One cause of inaccurate estimates may be that the samples are unrepresentative of the criteria. Another cause may be stale statistics or unnecessarily frequent updates to the data. When the underlying data changes, a histogram may need to be refreshed to accurately reflect the change. Current policies for triggering refresh of statistics may be heuristic and these policies may fail to refresh statistics when needed or may refresh too frequently. A further cause of inaccurate estimates may be the limited precision of histograms generally. As noted above, the actual distribution of data may be much more uneven than what can be represented by a histogram.

In view of the foregoing, various examples disclosed herein provide a system, non transitory computer-readable medium and method to estimate the performance of a database. In one aspect, the estimate may be calculated based at least partially on child nodes or content of a node located in a hierarchical data structure. Such data structures may be used to index a database. Rather than generating histograms based on samples that may or may not be representative of the criteria, the database index, which may be much more reliable than samples, may be used to generate the estimate. The nodes of the index may be utilized as equal area histograms, since the data associated with the nodes may be balanced in order to accelerate the searches. Moreover, hierarchical database indices may allow estimates to be calculated at various levels of precision. The aspects, features and advantages of the application will be appreciated when considered with reference to the following description of examples and accompanying figures. The following description does not limit the application; rather, the scope of the application is defined by the appended claims and equivalents.

Figure 1:
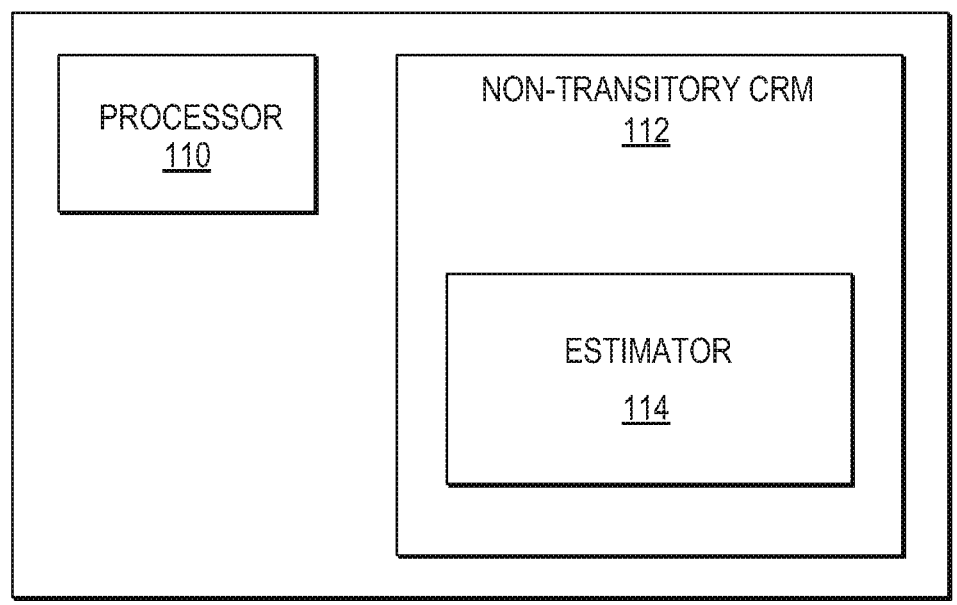
FIG. 1 is an example system in accordance with aspects of the disclosure.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.). The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include an estimator 114. Non-transitory CRM 112 may be used by or in connection with any instruction execution system that can fetch or obtain the logic from non-transitory CRM 112 and execute the instructions contained therein.

Non-transitory CRM 112 may also comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and computer readable mediums that may or may not be stored within the same physical housing or location. For example, non transitory CRM 112 may be a hard drive or other storage media located in a server farm of a data center. Accordingly, references to a processor, computer, or computer readable medium will be understood to include references to a collection of processors, computers, or mediums that may or may not operate in parallel.

Estimator 114 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be discussed in more detail below, a database index may be arranged as a hierarchical, tree-like data structure that relies on splitting and merging to maintain its balance and optimize searches. In one example, estimator 114 may instruct processor 110 to read a request to estimate an amount of data that would fall within a scope of criteria in a predicate without actually executing the predicate. In another aspect, estimator 114 may instruct processor 110 to locate a node in the data structure whose child nodes or content fall within the scope of the criteria. In yet a further example, the estimate may be calculated based at least partially on the located node.

Figure 2:
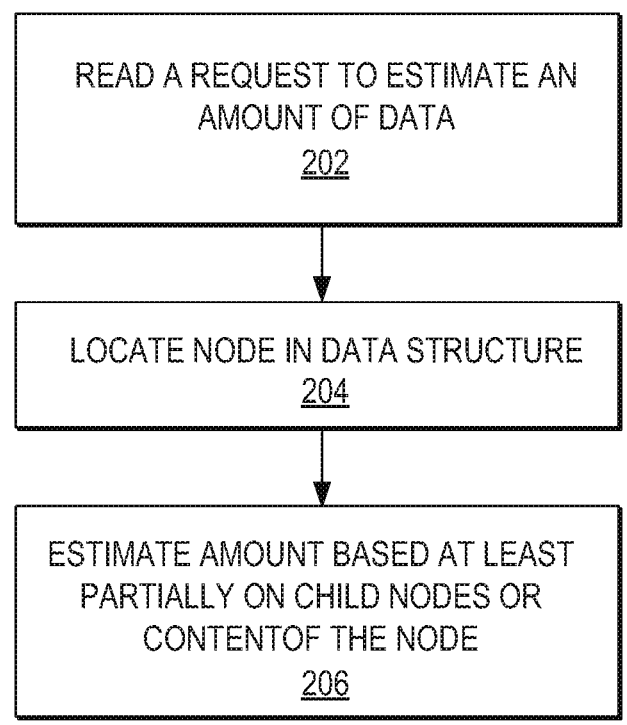
FIG. 2 is a flow diagram in accordance with aspects of the disclosure.
Figure 3:
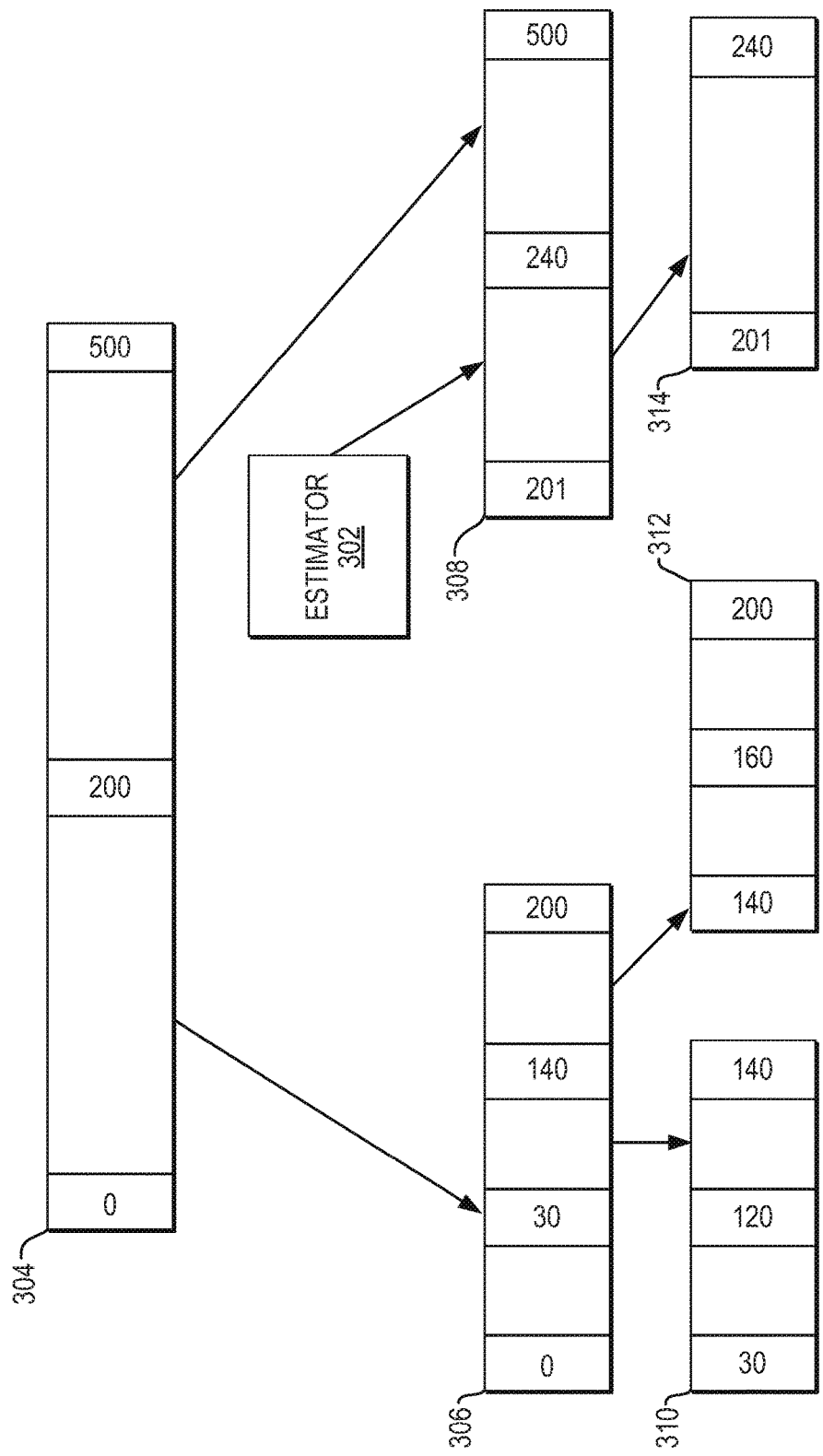
FIG. 3 is a working example in accordance with aspects of the disclosure.
Figure 4:
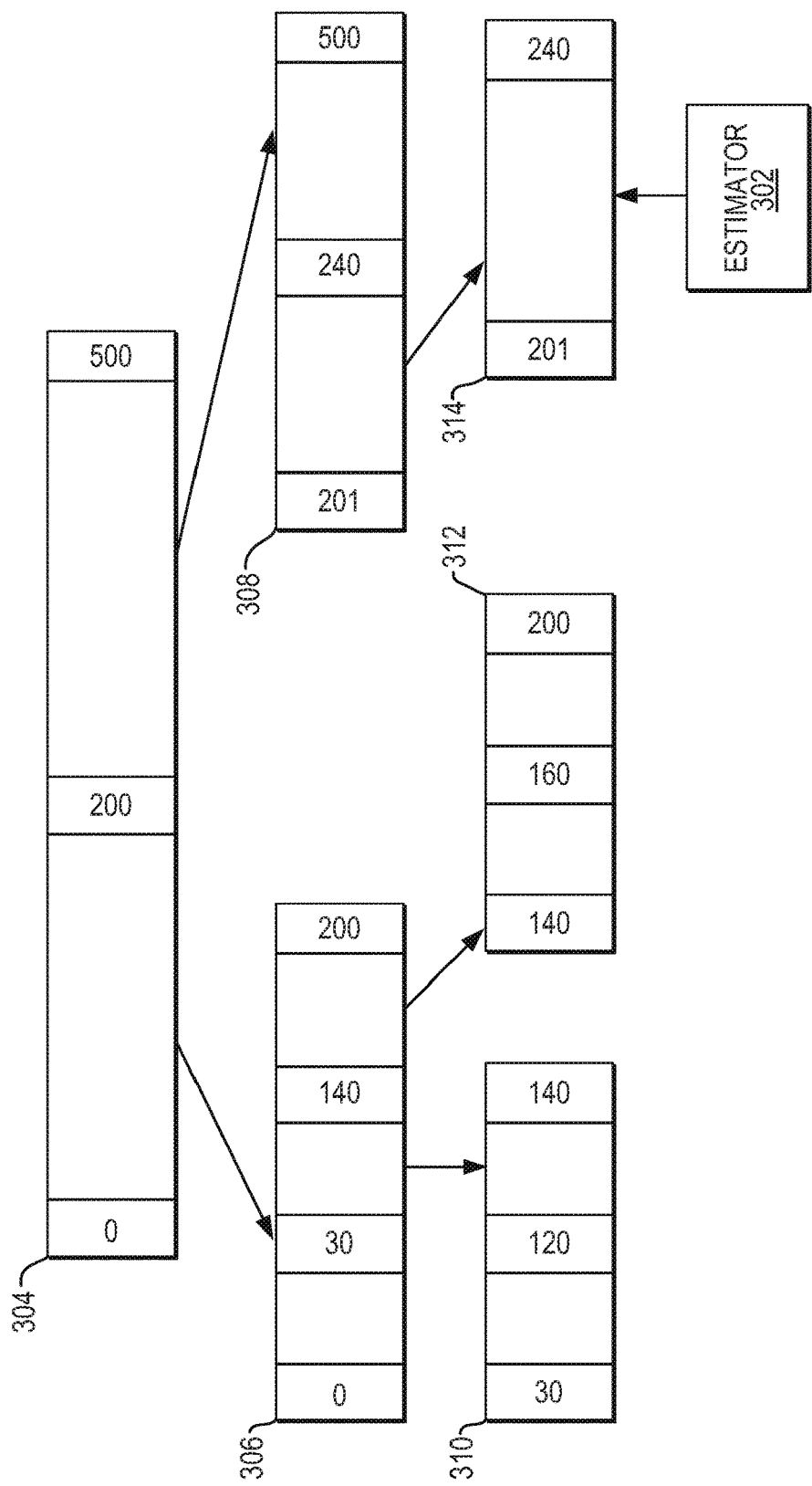
FIG. 4 is a further working example in accordance with aspects of the disclosure.

Working examples of the system, method, and non-transitory computer-readable medium are shown in FIGS. 2-4. In particular, FIG. 2 illustrates a flow diagram of an example method 200 for estimating database performance. FIGS. 3-4 each show a working example in accordance with the techniques disclosed herein. The actions shown in FIGS. 3-4 will be discussed below with regard to the flow diagram of FIG. 2.

In block 202 of FIG. 2, a request to estimate an amount of data in response to criteria in a predicate may be read. A node in a data structure may be located, as shown in block 204. Referring now to FIG. 3, an example data structure 300 is shown. While the example data structure of FIG. 3 is one type of B-tree data structure, it is understood that any type of balanced tree data structure may be used to implement the techniques disclosed herein including, but not limited to, B-plus trees, B-link trees or any other ad-hoc variation of a B-tree. Furthermore, other non B-tree data structures may also be used. The example B-tree in FIG. 3 is an index of an illustrative inventory database in which each product is associated with its own unique product number. For ease of illustration, the product numbers range from 0 to 500. The product numbers are used as keys in the index of the inventory database. Root node 304 may contain keys ranging from 0 to 500; thus, root node 304 contains the broadest range of keys. Interior node 306 has keys that range from 0 to 200 and interior node 308 has keys ranging from 201 to 500. Leaf node 310 contains the actual data of products associated with keys 30 to 140; leaf node 312 contains the actual data of products associated with keys 140 to 200; finally, leaf node 314 contains the actual data of products associated with keys 201 to 240. The data records maintained by the leaf nodes 310, 312, and 314 may be a linked list data structure of records.

A B-tree data structure may be configured to maintain its "balance" such that every path from the root node (e.g., root node 304) to a leaf node (e.g. leaf nodes 310, 312, and 314) is of the same length. Such balance may optimize a search for data beginning at the root node of the tree and ending at a leaf node. Particularly, a B-tree may be configured to maintain its balance when new data is added or deleted. That is, new data may be added or deleted in such a way that the balance is maintained. An interior node of a B tree may have a predetermined number of key entries that may be used as "separator keys" by a search engine. The keys allow a search engine to determine the correct path to the data sought after in the leaf nodes. The goal of database indices may be to optimize access time to data. As will be demonstrated below, a balanced index may also be used to provide accurate predicate response estimates.

In the example of FIG. 3, estimator 302 attempts to meet a request for an estimate of products whose associated keys are within the range of 201 to 500. In one example, estimator 302 may determine a level in the data structure hierarchy that corresponds to the scope of the criteria of the request. The node used to determine the estimate may be located at the level in the hierarchy of the data structure that corresponds to the scope. In the example of FIG. 3, interior node 308 and interior node 306 seem to be at a level corresponding to the scope of the criteria, with interior node 308 and interior node 306 holding keys ranging from 0 to 500; however, interior node 308 more precisely corresponds to the scope, since it holds keys ranging from 201 to 500. Estimator 302 may arrive at interior node 308 by reading the separator keys in root node 304 and following the link to interior node 308.

Referring back to FIG. 2, the requested estimated may be calculated based at least partially on the child nodes of the located node or on the content of the located node, as shown in block 206. As such, if the level in the hierarchy is not a leaf level, the located node may be an interior node whose child nodes fall within the scope of the criteria. This is the case in the example of FIG. 3. In the simplest case, the located node may be the root node. However, if the level is the leaf level, the located node may be a leaf node whose content falls within the scope of the criteria. As noted above, leaf nodes are the lowest level nodes of the hierarchy that contain the actual data records. Referring back to FIG. 3, estimator 302 may count the number of keys within the 201 to 500 range that are associated with the child nodes of interior node 308. The number of keys maintained by interior node 308 may be returned as the estimate of products associated with keys within the 201 to 500 range. In one example, the estimate may be returned as a cardinality estimate. In another example, cardinality may be defined as a number of records or rows of data that would be returned in response to a predicate. In a further example, the estimate may be returned as a selectivity estimate. In yet a further example, a selectivity estimate may be defined as a percentage of data that would be returned in response to a predicate.

Referring back to FIG. 3, interior node 308 has one child node, which is a leaf node containing records associated with a narrower range of keys, 201 to 240. That is, in this example, there are no records of products associated with a key higher than 240. Thus, the estimate returned above would actually be an estimate of records associated with keys within the 201 to 240 range and not within the 201 to 500 range. Simply retrieving the number of keys located in interior node 308 may mislead a user into thinking that there is a broader range of product numbers in the database. Such misleading estimates may occur with conventional techniques. However, in yet another aspect of the present disclosure, a new level in the hierarchy of the data structure that corresponds to the scope with enhanced precision may be determined. Referring now to FIG. 4, a user may send a request to re-estimate the amount of products associated with product numbers within the range of 201 to 500 with enhanced precision. In this instance, estimator 302 may move to the next level in the hierarchy from interior node 308 to leaf node 314, as shown in FIG. 4. In leaf node 314, estimator 302 may use the content of the leaf node to determine that the estimate does not include records associated with a product number higher than 240. The ability to enhance the estimate in this manner is one of the advantages of the techniques disclosed herein.

While the examples herein make reference to a single index data structure, it is understood that multiple indices may be used. The criteria of the estimate request may involve data located in various data sets each with its own index configuration. In this instance, a second node in a second data structure whose child nodes or content fall within the scope of the criteria may also be located. The estimate may be further calculated based at least partially on the child nodes or content of this second node. It is further understood that multiple indices may involve using a single index data structure multiple times (e.g., a self-join). Moreover, the examples herein are not limited to inner joins, but may also be applicable to semi-joins, outer joins, etc. Predicates across multiple indices may include conjunctive joins, disjunctive joins, unions, etc.

Advantageously, the above-described apparatus and method may provide more accurate estimates of database cardinality or selectivity by using the index of a database as its source of information. In this regard, balanced and well maintained index data structures may be used to provide estimates of cardinality or selectivity that are more precise that conventional techniques. In turn, users or consumers basing decisions on such estimates may be rest assured that the estimates are precise and reliable.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently.

The invention claimed is:

1. A system comprising:
   at least one hardware processor;
   a database comprising an index, the index comprising a hierarchical data structure of interlinked nodes;
   an estimator, in a computer readable medium, which upon execution instructs the at least one hardware processor to:
      read a request to estimate an amount of data in the hierarchical data structure that would fall within a scope of criteria in a predicate without executing the predicate;
      locate a node in the hierarchical data structure whose child nodes or content fall within the scope of the criteria;
      count a number of keys that are associated with the child nodes and that are within a key range of the located node; and
      return the number of keys as an estimate of the amount of data.

2. The system of claim 1, wherein the estimator upon execution instructs the at least one hardware processor to determine a level in a hierarchy of the hierarchical data structure that corresponds to the scope of the criteria.

3. The system of claim 2, wherein the node of the hierarchical data structure is located at the level in the hierarchy of the hierarchical data structure that corresponds to the scope of the criteria.

4. The system of claim 2, wherein the estimator upon execution instructs the at least one hardware processor to determine a new level in the hierarchy of the hierarchical data structure that corresponds to the scope of the criteria with enhanced precision.

5. The system of claim 1, wherein the estimator upon execution locates a second node in a second data structure whose child nodes or content fall within the scope of the criteria and to further calculate the estimate based at least partially on the child nodes or the content of the second node.

6. The system of claim 1, wherein the hierarchical data structure maintains its balance such that every path from a root node to a leaf node is of a same length.

7. The system of claim 1, wherein the estimator estimates a database performance.

8. The system of claim 1, wherein estimated amount of data in the hierarchical data structure corresponds to a database performance.

9. A non-transitory computer readable medium having instructions therein which, if executed, cause at least one processor to:
   read a request to estimate an amount of data in a B-tree data structure that would fail within a scope of criteria in a predicate without executing the predicate;
   determine a level in the B-tree data structure that corresponds to the scope of the criteria;
   locate a node in the B-tree data structure at the determined level whose child nodes or content fail within the scope of the criteria;
   count a number of keys that are associated with the child nodes and that are within a key range of the located node; and
   return the number of keys as an estimate of the amount of data.

10. The non-transitory computer readable medium of claim 9, wherein the instructions therein upon execution instruct at least one processor to determine a new level in a hierarchy of the B-tree data structure that corresponds to the scope of the criteria with enhanced precision.

11. The non-transitory computer readable medium of claim 9, wherein the instructions therein upon execution instruct at least one processor to locate a second node in a second data structure whose child nodes or content fall within the scope of the criteria and to further calculate the estimate based at least partially on the second node.

12. The non-transitory computer readable medium of claim 9, wherein the estimate comprises a cardinality estimate.

13. The non-transitory computer readable medium of claim 9, wherein the estimate comprises a predicate selectivity estimate.

14. The non-transitory computer readable medium of claim 9, wherein the B-tree data structure maintains its balance such that every path from a root node to a leaf node is of a same length.

15. A method comprising
   reading, using at least one processor, a request to estimate an amount of data in a data structure that falls within a scope of criteria in a predicate without executing the predicate;
   determining, using at least one processor, a level in the data structure that corresponds to the scope of the criteria;
   if the level is not a leaf level, locating, using at least one processor, an interior node at the determined level whose child nodes fall within the scope of the criteria and counting a number of keys that are associated with the child nodes and that are within a key range of the interior node;
   if the level is the leaf level, locating, using at least one processor, a leaf node at the leaf level whose content falls within the scope of the criteria and counting a number of keys that are associated with the leaf node; and returning the number of keys as an estimate of the amount of data.

16. The method of claim 15, wherein the estimate comprises a cardinality estimate.

17. The method of claim 15, wherein the estimate comprises a predicate selectivity estimate.

18. The method of claim 15, locating, using at least one processor, a second interior node in a second data structure whose child nodes fail within the scope of the criteria and to further calculate the estimate based at least partially on the second interior node.

19. The method of claim 15, locating, using at least one processor, a second leaf node in a second data structure whose content fails within the scope of the criteria and to further calculate the estimate based at least partially on the second leaf node.

20. The method of claim 15, wherein the data structure maintains its balance such that every path from a root node to the leaf node is of a same length.

* * * * *